W. FOREST & R. E. HUNT.
LOG CHAIN FASTENER.
APPLICATION FILED DEC. 6, 1913.

1,123,509.

Patented Jan. 5, 1915.

Witnesses
Frederick H Saylor
V. B. Hillyard

Inventors
W. Forest
and
R. E. Hunt.
By Victor J. Evans
Attorney

UNITED STATES PATENT OFFICE.

WILL FOREST AND ROME E. HUNT, OF OAKDALE, LOUISIANA.

LOG-CHAIN FASTENER.

1,123,509. Specification of Letters Patent. Patented Jan. 5, 1915.

Application filed December 6 1913. Serial No. 805,108.

*To all whom it may concern:*

Be it known that we, WILL FOREST and ROME E. HUNT, citizens of the United States, residing at Oakdale, in the parish of Allen and State of Louisiana, have invented new and useful Improvements in Log-Chain Fasteners, of which the following is a specification.

The loosening or releasing of log chains as generally fastened is attained with a certain degree of danger to the operator, this being due to the tendency of the logs when released to slip from the car.

The present invention provides a fastener which while secure may be operated to release the chain with perfect safety to the person so engaged in releasing the chain because the construction of the fastener is such as to admit of its release from a point remote from danger.

The invention consists of the novel features, details of construction and combination of parts, which hereinafter will be more particularly set forth, illustrated in the accompanying drawings and pointed out in the appended claims.

Figure 1:
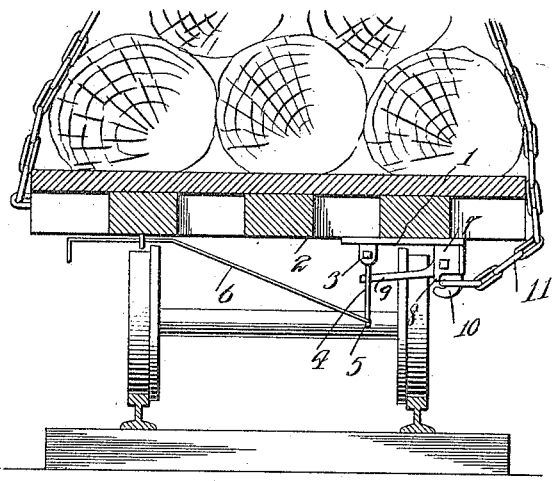
Figure 2:
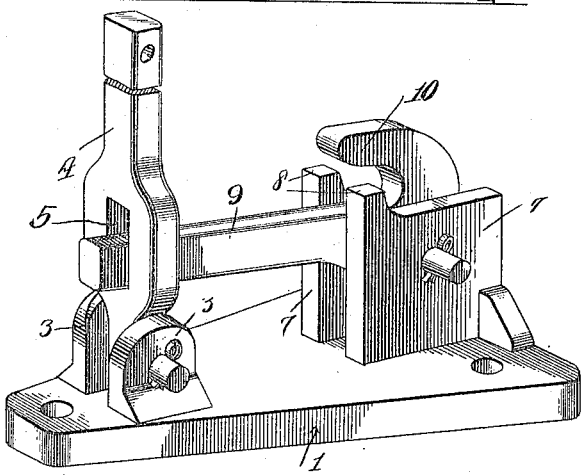
Figure 3:
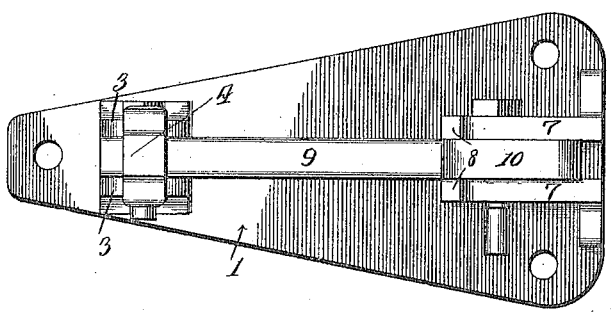

Referring to the drawings, forming a part of the specification, Figure 1 is a detail view of a logging car provided with a log chain fastener embodying the invention. Fig. 2 is a perspective view of the fastener on a larger scale. Fig. 3 is a view of the fastener as seen from the bottom side.

Corresponding and like parts are referred to in the following description and indicated in all the views of the drawings, by the same reference characters.

The fastener comprises a plate 1 which is adapted to be bolted or otherwise secured to the underside of the platform or bed of the car 2. Spaced lugs 3 are located at one end of the plate 1 and pivotally support an arm 4 which is provided near its upper end with an eye 5. A rod or other connection 6 is attached to the lower end of the arm 4 and extends to a convenient point to be pulled upon when it is required to swing the arm 4 to release the log chain or binder. Spaced lugs 7 are provided at the opposite end of the plate 1 and are formed at their lower inner corners with projections 8 which constitute stops to retain the link of the log chain or binder coöperating with the fastener. A lever 9 is formed at one end with a hook 10 and is pivoted between the lugs 7. When the lever 9 occupies an approximately horizontal position its free end enters the eye 5 of the arm 4 and is retained in such position thereby, and the hook 10 engages a link of the log chain or binder 11. When the lever 9 is in horizontal position the end of the hook 10 approaches close to the extremities of the projections 8 so as to maintain the link against possible displacement. When the lower end of the arm 4 is swung by pulling upon the connection 6 the free end of the lever 9 is released and the strain of the log chain upon the hook 10 causes such lever 9 to turn and release the log chain or binder. The logs usually leave the car from one side hence the rod or connection 6 is arranged to be operated from the opposite side of the car, thereby enabling the log chain or binder to be released without endangering the operator.

From the foregoing description, taken in connection with the accompanying drawing, the advantages of the construction and of the method of operation will be readily apparent to those skilled in the art to which the invention appertains, and while we have described the principle of operation, together with the device which we now consider to be the best embodiment thereof, we desire to have it understood that the device shown is merely illustrative, and that such changes may be made when desired as are within the scope of the claim appended hereto.

Having thus described the invention what is claimed as new, is:—

A fastener of the character specified comprising a plate provided at or near its opposite ends with spaced lugs, one set of such lugs having projections at their inner corners, an arm pivoted between the opposite set of lugs and having an eye near its pivot support, a connection extending from the free end of the arm to a convenient point for safe operation and a lever pivoted between the remaining set of lugs and having a hook to coöperate with the projections of such lugs to retain the part in engagement with the hook in place against casual displacement, said lever being adapted to enter the eye of the beforementioned arm and held in operative position thereby.

In testimony whereof we affix our signatures in presence of two witnesses.

WILL FOREST
ROME E. HUNT.

Witnesses:
J. M. HAMILTON,
CLAYTON THIGPEN.

Copies of this patent may be obtained for five cents each, by addressing the "Commissioner of Patents, Washington, D. C."